April 23, 1940.  T. L. FOLEY  2,198,159
TRAILER HITCH AND BRAKE
Original Filed March 14, 1938
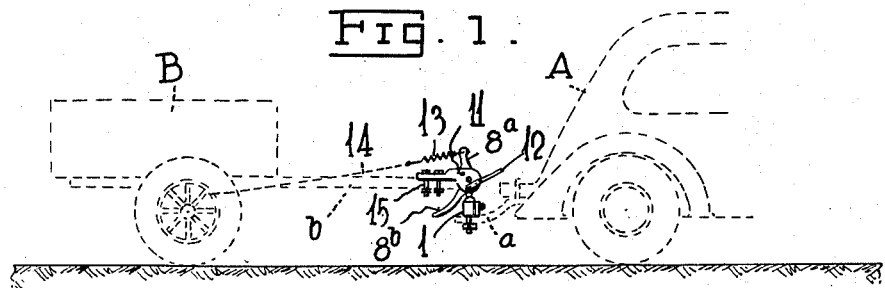
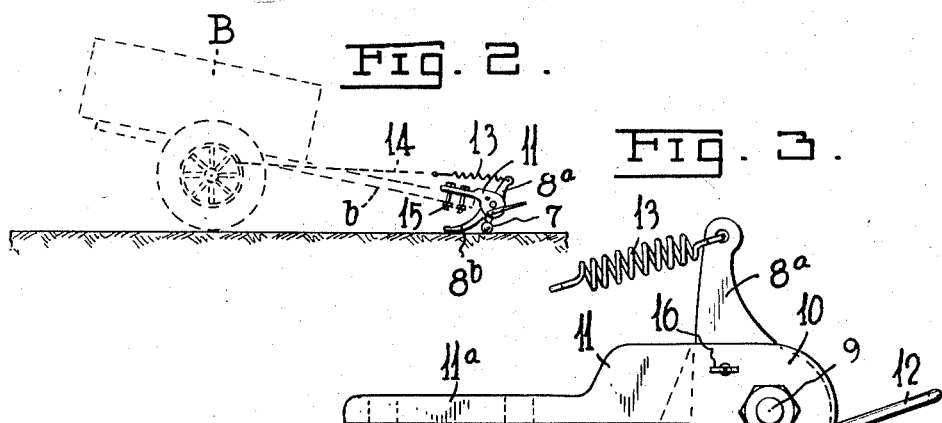
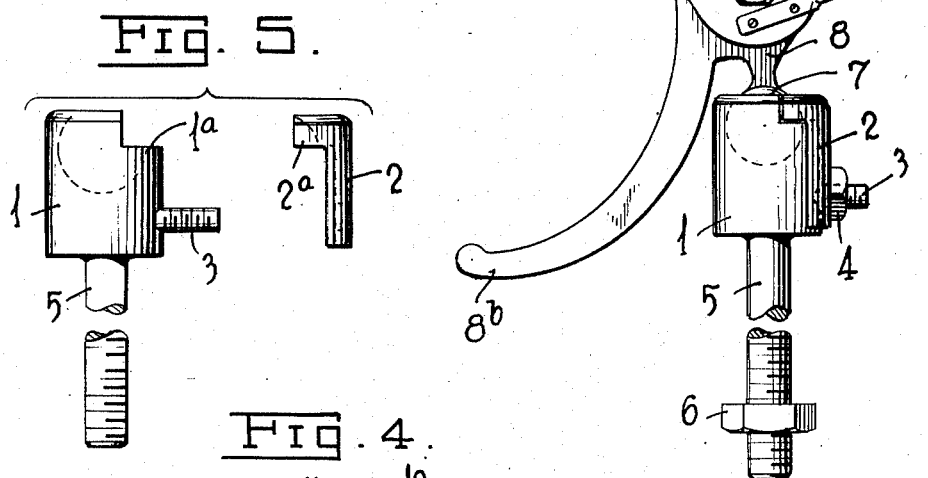
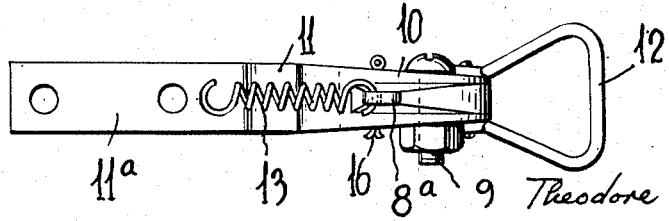
Inventor
Theodore L. Foley,
By Stone, Boyden & Mack.
Attorneys Patented Apr. 23, 1940

2,198,159

UNITED STATES PATENT OFFICE 2,198,159

TRAILER HITCH AND BRAKE

Theodore L. Foley, Red Bluff, Calif.

Application March 14, 1938, Serial No. 195,912
Renewed March 19, 1940

3 Claims. (Cl. 188—112)

This invention relates to couplings for connecting a trailer or drawn vehicle with a motor vehicle, and more particularly to a trailer coupling or hitch of this character having means for automatically actuating the trailer brake.

One object of the invention is to provide a device of this character in the nature of an accessory which may be separately manufactured and sold independently to purchasers, regardless of the type of trailer or motor vehicle with which it is to be used.

Another object is to provide a device of this character consisting of the fewest possible number of parts, and which shall be simple and cheap to manufacture, light in weight, and positive and efficient in operation.

Still another object is to devise a combined hitch and brake actuating means in which, should the coupling become disconnected from the motor vehicle, the trailer brakes will be automatically applied.

With the above and other objects in view, the invention consists in the construction and arrangement of parts hereinafter described and claimed, and illustrated in the accompanying drawing, in which:

Fig. 1 is a side elevation of my improved hitch or coupling, the same being illustrated as it appears when in use between a motor vehicle and a trailer, parts being broken away and parts being shown in dotted lines;

Fig. 2 is a similar view but illustrating the coupling and trailer as disconnected from the motor vehicle;

Fig. 3 is a side elevation on an enlarged scale, showing my improved hitch or coupling itself;

Fig. 4 is a plan view of the device shown in Fig. 3; and

Fig. 5 is a side elevation of one of the coupling members illustrated in Fig. 3, showing the parts thereof separated.

Referring to the drawing in detail, my improved hitch or coupling comprises a socket member consisting of a main portion 1 and an auxiliary portion 2. The main portion 1 is cut away at the top, as shown at 1ª, to provide a notch, and the auxiliary portion 2 is provided with a lateral extension 2ª adapted to fill said notch and serving to complete the spherical socket, and to provide an adjustment to compensate for wear. The auxiliary portion 2 is secured to the main portion 1 by means of a bolt 3 and nut 4, as clearly shown in the drawing.

Extending downwardly from the socket member is a post or shank 5, screw threaded at its lower end and provided with a clamping nut 6, this being for the purpose of rigidly securing the socket member to a motor vehicle.

Adapted to fit within the upwardly opening spherical socket formed in the portions 1 and 2 constituting the socket member is a ball 7 rigidly carried by and preferably formed integral with a lever 8. This lever 8 is pivotally connected by a bolt 9 with the bifurcated end 10 of a member 11 having an extension 11ª adapted to be secured to the tongue or other part of a trailer as by means of bolts 15 (see Figs. 1 and 2). A loop or handle 12 is preferably rigidly secured to the bifurcated end 10 of the member 11, by means of which those parts of the coupling which are secured to the trailer may be conveniently manipulated. It will be noted that the pivotal connection 9 is located above the socket member 1, but is slightly offset from the axis thereof. This insures that the lever 8 is free to move at all times without binding, regardless of the load in the trailer.

The lever 8, when in use, is disposed in a vertical plane and comprises an upper portion 8ª, to which is secured the trailer brake operating rod 14, a heavy spring 13 being preferably interposed between the lever and rod to provide a cushion so as to avoid shocks.

In Fig. 1 the rear of a motor vehicle is indicated at A and this is shown as equipped with a suitable draft bar $a$ to which the shank 5 of the socket member is secured. A trailer of any desired type is indicated at B and is shown as having a tongue $b$ or the like which is rigidly secured to the member 11 by means of the bolts 15, as above mentioned.

The ball and socket connection 1, 2, 7, constitutes a universal joint, and this permits perfect freedom of relative movement between the trailer and motor vehicle in all directions. In other words, the trailer may pivot either vertically or horizontally, or at any angle in between.

Owing to the pivotal connection 9 between the lever 8 and the member 11, and assuming the vehicles to be travelling forwardly, it will be seen that when the motor vehicle slows down, the trailer, owing to its momentum, will tend to move closer to it, and this relative movement on the part of the trailer will tend to rock the lever 8 about the ball joint 7 and thus cause the upper end of the lever to exert a pull on the brake actuating rod 14, and apply the brakes to the trailer wheels. When, however, the motor vehicle again speeds up, the pull of the trailer will swing the lever rearwardly again and release the trailer brakes.

It is sometimes desirable to move both the motor vehicle and trailer rearwardly, and in order to prevent the setting of the trailer brakes during such backing up movement, I provide a pin 16 which may be inserted in aligned openings in the member 11 and lever 8, so as to lock these parts together and prevent relative movement thereof.

The lower end of the lever 8 terminates in a downwardly projecting and preferably curved tail piece 8b. It will be seen that this tail piece extends well below the member 11 and also considerably below the ball 7 of the universal joint. Should, therefore, this universal joint become accidentally disconnected, and the front part of the trailer, carrying the other portions of the coupling, fall to the ground, as shown in Fig. 2, this tail piece 8b will strike the ground, and in so doing will swing the lever on its pivot 9 so that its upper end will exert a pull upon the brake actuating rod 14 and thus automatically apply the trailer brakes.

This extension or tail piece 8b of the lever 8 is also useful under normal conditions, if it is desired to park the trailer on sloping ground. In this event, all that is necessary is to place an ordinary jack under the tail piece and, by forcing it upward, the trailer brakes can be applied and held in braking position. This will maintain the trailer at rest and prevent it from rolling, without the necessity of placing blocks under the wheels.

It will thus be seen that I have provided a combined coupling and brake mechanism which comprises only a single lever, this being pivotally connected directly both with the socket member 1, secured to the motor vehicle, and with the member 11, secured to the trailer. Thus, the device essentially consists of but three parts, and is of exceedingly simple construction.

What I claim is:

1. A trailer hitch comprising a member adapted to be rigidly secured to the trailer, a second member adapted to be rigidly secured to a motor vehicle, a vertically disposed lever pivotally connected directly with both of said members, and trailer brake actuating means connected with the upper end of said lever, the lower end of said lever being free and extending a substantial distance below said first member and adapted to engage the ground when disconnected from the motor vehicle.

2. In a trailer hitch, the combination with a member having a socket and adapted to be rigidly secured to a motor vehicle, of a vertically disposed lever having a ball adapted to fit within said socket, and also having a tail piece extending downwardly below said ball, means for pivotally connecting said lever with the trailer, and a trailer brake actuating means connected with the upper end of said lever, the lower end of said tail piece being adapted to engage the ground to apply the trailer brake when said ball is disengaged from said socket.

3. A trailer hitch comprising a member adapted to be rigidly secured to the trailer, a second member adapted to be rigidly secured to a motor vehicle and having an upwardly opening socket, a vertically disposed lever pivotally connected with said first member and carrying a ball adapted to fit within said socket, and trailer brake actuating means connected with said lever, said pivotal connection being located above said socket but slightly offset from the vertical axis thereof.

THEODORE L. FOLEY.